(12) United States Patent
Rajput et al.

(10) Patent No.: US 11,716,252 B2
(45) Date of Patent: Aug. 1, 2023

(54) METHODS, SYSTEMS, AND COMPUTER READABLE MEDIA FOR GENERATING NETWORK FUNCTION (NF) SET LOAD INFORMATION AWARE NF DISCOVERY RESPONSE

(71) Applicant: Oracle International Corporation, Redwood Shores, CA (US)

(72) Inventors: Jay Rajput, Bangalore (IN); Virendra Singh, Bangalore (IN); Ankit Srivastava, Gorakhpur (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 0 days.

(21) Appl. No.: 17/376,082

(22) Filed: Jul. 14, 2021

(65) Prior Publication Data

US 2023/0019209 A1    Jan. 19, 2023

(51) Int. Cl.
*H04L 41/12* (2022.01)
*H04L 43/10* (2022.01)

(52) U.S. Cl.
CPC .............. *H04L 41/12* (2013.01); *H04L 43/10* (2013.01)

(58) Field of Classification Search
CPC . H04L 43/0876; H04L 67/1036; H04L 43/10; H04L 41/12
See application file for complete search history.

(56) References Cited

U.S. PATENT DOCUMENTS

| 10,243,789 B1 * | 3/2019 | Naylor ................... H04L 63/02 |
| 11,271,846 B2 | 3/2022 | Krishan |
| 2020/0053828 A1 * | 2/2020 | Bharatia ............... H04W 76/11 |

(Continued)

FOREIGN PATENT DOCUMENTS

| KR | 20210023299 A | 3/2021 |
| WO | WO-2020/202043 A1 | 10/2020 |
| WO | WO-2021160774 A1 * | 8/2021 |

OTHER PUBLICATIONS

ETSI TS 129.500 Version 16.4.0 (Nov. 2020) (Year: 2020).*

(Continued)

*Primary Examiner* — Tonia L Dollinger
*Assistant Examiner* — Linh T. Nguyen
(74) *Attorney, Agent, or Firm* — Jenkins, Wilson, Taylor & Hunt, P.A.

(57) ABSTRACT

A method for generating network function (NF) set load information aware NF discovery responses includes, at an NF repository function (NRF), receiving NFUpdate messages from producer NF instances. The method further includes collecting or generating, from the NFUpdate messages, NF set load information for NF sets of which the producer NF instances are members. The method further includes receiving, from a consumer NF, an NF discovery request. The method further includes generating, using query parameters in the NF discovery request, an NF discovery response including NF profiles of producer NF instances corresponding to the query and, including, in the NF discovery response, NF set load information for NF sets of producer NF instances whose NF profiles are included in the NF discovery response. The method further includes forwarding the NF discovery response including the NF set load information to the consumer NF.

16 Claims, 6 Drawing Sheets

(56) References Cited

U.S. PATENT DOCUMENTS

| | | | |
|---|---|---|---|
| 2020/0136911 A1* | 4/2020 | Assali | H04L 41/5032 |
| 2020/0267214 A1* | 8/2020 | Yang | H04L 67/1001 |
| 2020/0336369 A1 | 10/2020 | Ratnasamy et al. | |
| 2020/0367045 A1* | 11/2020 | Jeong | H04W 8/26 |
| 2021/0297896 A1 | 9/2021 | Landais et al. | |
| 2021/0306211 A1* | 9/2021 | Landais | H04L 41/0686 |
| 2021/0400757 A1 | 12/2021 | Dhanani et al. | |
| 2022/0053372 A1 | 2/2022 | Shekhar et al. | |
| 2022/0086218 A1 | 3/2022 | Sabella et al. | |
| 2022/0103443 A1* | 3/2022 | Mary | H04L 43/20 |
| 2023/0022955 A1 | 1/2023 | Rajput et al. | |

OTHER PUBLICATIONS

ETSI TS 129.510 Version 16.5.0 (Nov. 2020) (Year: 2020).*

ETSI TS 129.500 Version 16.7.0 (Apr. 2021) (Year: 2021).*

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Services and System Aspects; Procedures for the 5G System (5GS); Stage 2 (Release 17)," 3GPP TS 23.502, V17.0.0, pp. 1-489 (Mar. 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-163 (Mar. 2021).

Notification of Transmittal of the International Search Report and the Written Opinion of the International Searching Authority, or the Declaration for International Application No. PCT/US2022/037031 (dated Nov. 8, 2022).

"3rd Generation Partnership Project; Technical Specification Group Core Network and Terminals; Study on Load and Overload Control of 5GC Service Based Interfaces; (Release 16)," 3GPP TR 29.843, V16.0.0, pp. 1-39 (Sep. 2019).

Non-Final Office Action for U.S. Appl. No. 17/376,095 (dated Sep. 15, 2022).

Commonly-Assigned, co-pending U.S. Appl. No. 17/376,095 for "Methods, Systems and Computer Readable Media for Generating and Using Network Function (NF) Set Overload Control Information (OCI) and Load Control Information (LCI) at Service Communications Proxy (SCP)" (Unpublished, filed Jul. 28, 2021).

Notice of Allowance and Fee(s) Due for U.S. Appl. No. 17/376,095 (dated Jan. 26, 2023).

* cited by examiner

METHODS, SYSTEMS, AND COMPUTER READABLE MEDIA FOR GENERATING NETWORK FUNCTION (NF) SET LOAD INFORMATION AWARE NF DISCOVERY RESPONSE

TECHNICAL FIELD

The subject matter described herein relates to load control in communications networks. More particularly, the subject matter described herein relates to methods, systems, and computer readable media for generating an NF set load information aware NF discovery response.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as load and overload control information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the service communication proxy, and the service communication proxy load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G communications networks is that NF discovery responses do not include load control information for NF sets. An NF set is a group of interchangeable NF instances of the same type, supporting the same services and the same network slice(s). An NF instance is an instance of an NF that provides a service. An example of an NF instance is an access and mobility management function (AMF) instance that provides access and mobility management service for a user equipment (UE).

As stated above, NF discovery is a process through which consumer NFs query the NRF to obtain NF profiles of producer NFs that are capable of providing service to the consumer NFs. An NF profile is a data structure defined in 3GPP 29.510 that includes the service attributes of a producer NF instance. The NF profile can identify the NF set of which a producer NF instance is a member. However, the NF profile does not contain load control information for the NF set.

3GPP defines a load control mechanism for better load balancing across NF service producers to prevent their overload (preventive action) by enabling NF service producers to signal load information to NF service consumers, either via the NRF or directly to the NF service consumers using the 3gpp-Sbi-Lci header. NF set LCI is not available to the consumer NF at the time of NF discovery or initial NF selection. An NF in an overloaded NF set should not be preferred over an NF in an non-overloaded NF set. However, because LCI for the NF set is not conveyed in the NF discovery response, a consumer NF may select an NF set that is overloaded, which can result in a connection to the overloaded producer NF being denied and the consumer NF having to repeat the NF selection process.

Accordingly, in light of these and other difficulties, there exists a need for improved NF discovery procedures that can convey to consumer NFs load control information for an NF set.

SUMMARY

A method for generating network function (NF) set load information aware NF discovery responses includes, at an NF repository function (NRF), receiving NFUpdate messages from producer NF instances. The method further includes collecting or generating, from the NFUpdate messages, NF set load information for NF sets of which the producer NF instances are members. The method further includes receiving, from a consumer NF, an NF discovery request. The method further includes generating, using query parameters in the NF discovery request, an NF discovery response including NF profiles of producer NF instances corresponding to the query and, including, in the NF discovery response, NF set load information for NF sets of producer NF instances whose NF profiles are included in the NF discovery response. The method further includes forwarding the NF discovery response including the NF set load information to the consumer NF.

According to another aspect of the subject matter described herein, receiving the NFUpdate messages includes receiving NF heart-beat messages.

According to another aspect of the subject matter described herein, receiving NFUpdate messages from producer NF instances includes receiving NFUpdate messages including NF set load control information (LCI) and collecting or generating the NF set load information includes reading the NF set LCI from the NFUpdate messages and storing the NF set LCI in a database local to the NRF.

According to another aspect of the subject matter described herein, receiving NFUpdate messages from producer NF instances includes receiving NFUpdate messages including producer NF instance load control information (LCI) and collecting or generating the NF set load information includes reading the NF instance LCI from the NFUpdate messages, calculating NF set LCI from the NF instance LCI, and storing the NF set LCI in a database local to the NRF.

According to another aspect of the subject matter described herein, calculating the NF set LCI includes generating a sum using the NF instance LCI.

According to another aspect of the subject matter described herein, generating the sum includes adding normalized loads of the producer NF instances using the following expression:

Load(nfSet)=ΣNormalized Loads of NF Instances, where Load(nfSet) is the LCI for the NF set and ΣNormalized Loads of NF Instances is a sum of normalized loads of the producer NF instances.

According to another aspect of the subject matter described herein, the method for generating NF set load information aware discovery responses includes computing the normalized loads of the producer NF instances using the following expression:

$$\text{Normalized Load of } NF_n = \frac{Load_n * Capacity_n}{\sum \text{Capacities of } NF \text{ instances in the } NF \text{ set}}$$

where $NF_n$ is the nth producer NF instance whose normalized load is being calculated, n being an integer, $Load_n$ is a computed or reported load is the LCI computed for producer NF instance $NF_n$ and $Capacity_n$ is a processing capacity of producer NF instance $NF_n$.

According to another aspect of the subject matter described herein, the method for generating NF set load information aware discovery responses includes, at the consumer NF, using the NF set load information in selecting a producer NF set and a producer NF instance to process a service based interface (SBI) request.

According to another aspect of the subject matter described herein, using the NF set load information in selecting a producer NF set and a producer NF instance to process an SBI request includes selecting a first producer NF set having an NF set control information attribute value that is lower than an NF set load control information attribute value determined for a second producer NF set and selecting a producer NF from producer NFs in the first producer NF set.

According to another aspect of the subject matter described herein, the producer NF selected from the producer NFs in the first NF set has an NF instance load control information attribute value that is higher than an NF instance load control information value than an NF instance load control information value for a producer NF in the second producer NF set.

According to another aspect of the subject matter described herein, a system for generating network function (NF) set load information aware NF discovery responses includes an NF repository function (NRF) including at least one processor and a memory. The system further includes an NF set load information generator/collector implemented by the at least one processor for receiving NFUpdate messages from producer NF instances, collecting or generating, from the NFUpdate messages, NF set load information for NF sets of which the producer NF instances are members. The system further includes an NF discovery request handler implemented by the at least one processor for receiving, from a consumer NF, an NF discovery request, generating, using query parameters in the NF discovery request, an NF discovery response including NF profiles of producer NF instances corresponding to the query parameters, including, in the NF discovery response, NF set load information for NF sets of producer NF instances whose NF profiles are included in the NF discovery response, and forwarding the NF discovery response including the NF set load information to the consumer NF.

According to another aspect of the subject matter described herein, the NFUpdate messages include NF heart-beat messages.

According to another aspect of the subject matter described herein, the NFUpdate messages include NF set load control information (LCI) and the NF set load information generator/collector is configured to read the NF set LCI from the NFUpdate messages and storing the NF set LCI in a database local to the NRF.

According to another aspect of the subject matter described herein, the NFUpdate messages include NF instance load control information (LCI) and the NF set load information generator/collector is configured to collect or generate the NF set load information by reading the NF instance LCI from the NFUpdate messages, calculating NF set LCI from the NF instance LCI, and storing the NF set LCI in a database local to the NRF.

According to another aspect of the subject matter described herein, the NF set load information generator/collector is configured to calculate the NF set LCI by generating a sum using the NF instance LCI.

According to another aspect of the subject matter described herein, the NF set load information generator/collector is configured to generate the sum by adding normalized loads of the producer NF instances using the following expression:

Load(nfSet)=ΣNormalized Loads of NF Instances, where Load(nfSet) is the LCI for the NF set and ΣNormalized Loads of NF Instances is a sum of normalized loads of the producer NF instances.

According to another aspect of the subject matter described herein, the NF set load information generator/collector is configured to compute the normalized loads of the producer NF instances using the following expression:

$$\text{Normalized Load of } NF_n = \frac{Load_n * Capacity_n}{\sum \text{Capacities of } NF \text{ instances in the } NF \text{ set}}$$

where $NF_n$ is the nth producer NF instance whose normalized load is being calculated, n being an integer, $Load_n$ is a computed or reported load is the LCI computed for producer NF instance $NF_n$ and $Capacity_n$ is a processing capacity of producer NF instance $NF_n$.

According to another aspect of the subject matter described herein, the system for generating network function (NF) set load information aware NF discovery responses includes the consumer NF, where the consumer NF is configured to use the NF set load information in selecting a producer NF set and a producer NF instance to process an SBI request by selecting a first producer NF set having an NF set control information attribute value that is lower than an NF set load control information attribute value determined for a second producer NF set and selecting a producer NF from producer NFs in the first producer NF set.

According to another aspect of the subject matter described herein, the producer NF selected from the producer NFs in the first NF set has an NF instance load control information attribute value that is higher than an NF instance load control information value than an NF instance load control information value for a producer NF in the second producer NF set.

According to another aspect of the subject matter described herein, a non-transitory computer readable medium having stored thereon executable instructions that when executed by a processor of a computer control the computer to perform steps is provided. The steps are performed at a network function (NF) repository function (NRF). The steps include receiving NFUpdate messages from producer NF instances. The steps further include collecting or generating, from the NFUpdate messages, NF set load information for NF sets of which the producer NF instances are members. The steps further include receiving, from a consumer NF, an NF discovery request. The steps further include generating, using query parameters in the NF discovery request, an NF discovery response including NF profiles of producer NF instances corresponding to the query parameters. The steps further include including, in the NF discovery response, NF set load information for NF sets of producer NF instances whose NF profiles are included in the NF discovery response. The steps further include forwarding the NF discovery response including the NF set load information to the consumer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
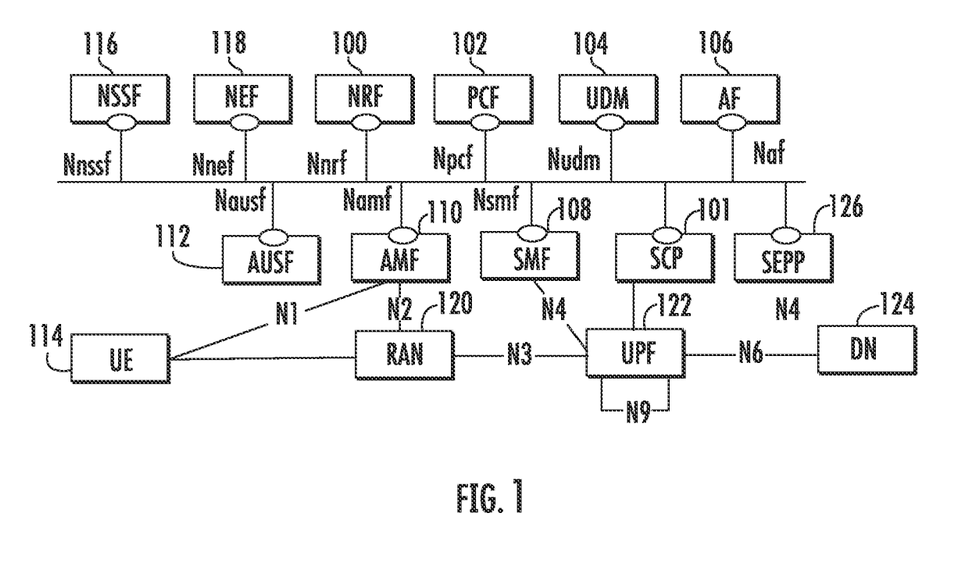
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFS, or both, depending on whether they are requesting, providing, or requesting and providing services. In the illustrated example, the NFs include a policy control function (PCF) 102 that performs policy related operations in a network, a unified data management (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem or shortcoming of existing 5G networks is the inability to convey LCI for an NF set during NF discovery. 3GPP TS 29.500 Section 6.3 defines load information based on the NRF or the LCI header. Currently, the NRF can provide load information for an NF instance or an NF service instance but not for an NF set. The LCI header can provide load information for different scopes—NF instance, NF set, NF service instance, or NF service set. The points to highlight are that NF set load information is not available from the NRF and obtaining load information from the LCI header requires active signaling with the producer NF, which is not available to the consumer NF at the time of NF discovery. Table 1 shown below illustrates the relationship between an NF instance, an NF set, and an NF service set.

TABLE 1

| Relationships between NF Sets, NF Service Sets, and NF Instances\ | |
|---|---|
| Term | Definition |
| NF Instance | An identifiable instance of the NF. An NF Instance may provide services offered by one or more NF Service instances. |
| NF Service Instance | An identifiable instance of the NF service. |
| NF Service Set | A group of interchangeable NF service instances of the same service type within an NF instance. The NF service instances in the same NF service set have access to the same context data. |
| NF Set | A group of interchangeable NF instances of the same type, supporting the same services and the same network slice(s). The NF instances in the same NF set may be geographically distributed but have access to the same context data. |

The data in Table 1 comes from Section 3.1 of 3GPP TS 29.500. As indicated in Table 1, an NF set is a group of interchangeable NF instances of the same type capable of providing the same service. Because consumer NFs need to select an NF set that has sufficient capacity to provide a service requested by the consumer NFs, it is desirable to provide a method for efficiently determining and communicating NF set load control information during NF discovery.

NF load control information is carried in the 3gpp-Sbi-Lci header of SBI response messages sent from a producer NF to a consumer NF and is used by the consumer NF to avoid selecting producer NFs that are heavily loaded. 3GPP TS 29.500, Section 5.2.3.2.10 indicates the following mandatory attributes in LCI headers: timestamp, load metric and lcScope (different scopes). One or more LCI headers can be present in a message. The following is an example of a 3GPP LCI header:

3gpp-Sbi-Lci: Timestamp: "Tue, 4 Feb. 2020 08:49:37 GMT"; Load-Metric: 100%; NF-Set: set1.udmset.5gc.mnc012.mcc345

In the example header, the timestamp identifies the time the load metric is being reported. 3GPP TS 29.50, Section 6.2.6 defines the load metric as a number between 0 and 100. In the illustrated example, the load metric value of 100% indicates that the producer NF is in an overloaded state. The scope parameter value identifies the scope as being an NF set and specifies the NF set, set1.udmset.5gc.mnc012.mcc345.

Even though 3GPP TS 29.500 specifies how NF set load control information can be carried in an SBI response message, neither 3GPP TS 29.500 nor 3GPP TS 29.510 specifies NF set load control information as part of the NF discovery response. In addition, neither 3GPP TS 29.500 nor 3GPP TS 29.510 specifies how LCI would be generated by the NRF.

NF consumers are not aware of NF set LCI due to lack of active signaling between NF consumers and NF producers before producer NF selection. An NF consumer as part of NF discovery processing can choose an NF in an overloaded NF set, which may result in subsequent SBI request failures. Even though the chosen producer NF may not be overloaded, the NF set may be overloaded. In addition, the chosen producer NF may soon receive redirect requests from consumers of other mate NFs in the NF set because the mate NFs are overloaded, even though the chosen producer NF in not currently in an overloaded state. However, the redirect requests may soon cause the chosen producer NF to enter an overloaded state. Accordingly, there is a need to take NF set LCI into account when selecting NFs.

Figure 2:
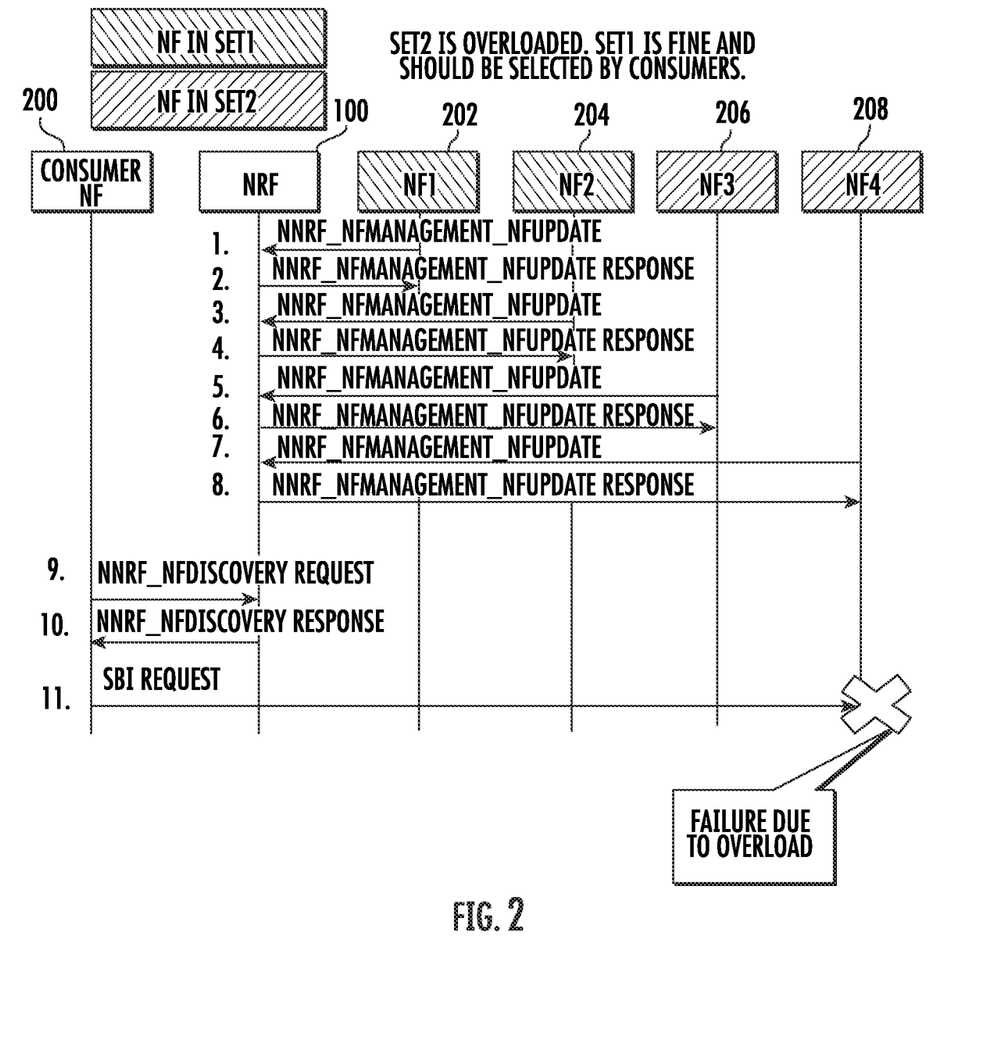
FIG. 2 is a message flow diagram illustrating exemplary messages exchanged for NF discovery and selection without conveying NF set LCI in NF discovery responses.

FIG. 2 is a message flow diagram illustrating exemplary messages exchanged when a consumer NF 200 lacks LCI for an NF set and selects a producer NF from an NF set that is in an overloaded state. In FIG. 2, NF1 202 and NF2 204 are in NF set Set1. NF set Set1 is in a non-overloaded state. NF3 206 and NF4 208 are in NF set Set2, which is in an overloaded state.

Referring to the message flow in FIG. 2, in step 1, NF1 202 sends an NFUpdate message to NRF 100 to update the status of NF1 202 with NRF 100. While the NFUpdate message may include LCI for NF1 202, the NFUpdate message will not include LCI for the NF set, Set1. In step 2 of the message flow diagram, NRF 100 responds to the NFUpdate message in step 1 with an NFUpdate response. In step 3 of the message flow diagram, NF2 204 sends an NFUpdate message to NRF 100. The NFUpdate message may include LCI for NF2 204, but does not include LCI for the NF set, Set1. In step 4 of the message flow diagram, NRF 100 responds to the NFUpdate message in step 3 with an NFUpdate response.

In step 5 of the message flow diagram, NF3 206 sends an NFUpdate message to NRF 100. The NFUpdate message may include LCI for NF3 206, but does not include LCI for the NF set, Set2. In step 6 of the message flow diagram, NRF 100 responds to the NFUpdate message in step 5 with an NFUpdate response. In step 7 of the message flow diagram, NF4 208 sends an NFUpdate message to NRF 100. The NFUpdate message may include LCI for NF4 208, but does not include LCI for the NF set, Set2. In step 8 of the message flow diagram, NRF 100 responds to the NFUpdate message in step 7 with an NFUpdate response.

In step 9 of the message flow diagram, consumer NF 200 sends an NF discovery request to NRF 100. NRF 100 receives the NF discovery request and performs a lookup in its NF profiles database using query parameters in the NF discovery request. NRF 100 locates NF profiles that match the query parameters in the NF discovery request. In step 10, NRF 100 sends an NF discovery response to consumer NF 200. The NF discovery response includes the NF profiles that matched the query parameters identified in the NF discovery request. However, the NF discovery response does not indicate load control information for NF sets of any of the producer NFs whose NF profiles are included in the NF discovery response.

Consumer NF 200 receives the NF discovery response and selects one of the producer NFs to provide service based on priority parameters specified in the NF profiles. In this example, it is assumed that consumer NF 100 selects producer NF3 206 to provide the service. In step 11, consumer NF 100 sends and SBI request message to NF4 208. NF4 208 is in an NF set that is overloaded. In this example, NF4 208 is also overloaded. As a result, the SBI request fails. Consumer NF 200 is then required to perform reselection of a producer NF and sends a new SBI request to the reselected NF, which is inefficient and increases network traffic.

Tables 2 and 3 shown below illustrate a problem that can occur when load of an NF set is not used in producer NF selection.

TABLE 2

NF Instance Information

| NF Name | Load | Priority | Capacity | NF Set |
|---|---|---|---|---|
| NF1 | 70 | 1 | 100 | Set1 |
| NF2 | 70 | 1 | 100 | Set1 |
| NF3 | 95 | 1 | 100 | Set2 |
| NF4 | 65 | 1 | 100 | Set2 |

TABLE 3

NF Set Load Information

| NF Set Name | Load |
|---|---|
| Set1 | 70 |
| Set2 | 80 |

At the time of receipt of a discovery response, the NF set loading information in Table 3 would not be known to the consumer NF. The data in Table 2 may be known to the consumer NF through a combination of the NF profile and any LCI headers containing LCI for NF instances that are delivered to the consumer NF. Using the data in Table 2, the consumer NF would first select the producer NF with the lowest priority attribute value (lower priority attribute value means more preferred). Since all of the producer NFs have the same priority attribute, the consumer NF would then look to load and select the producer NF with the lowest load metric attribute value. In Table 2, NF4 has the lowest load metric attribute value of 65. As a result, the consumer NF would select NF4 and would send an SBI request to NF4, as illustrated by step 11 in FIG. 2.

As illustrated in Table 2, NF4 is a member of NF set Set2, which is 80% loaded. Set1 is only 70% loaded. Thus, by selecting the NF set that is more loaded, the consumer NF increases the likelihood of failure of subsequent SBI requests due to overloaded producer NF instances in the NF set. For example, if NF3 in Set2 becomes overloaded, SBI requests directed to NF4 will be redirected to NF3, and NF3 will eventually become overloaded.

Figure 3:
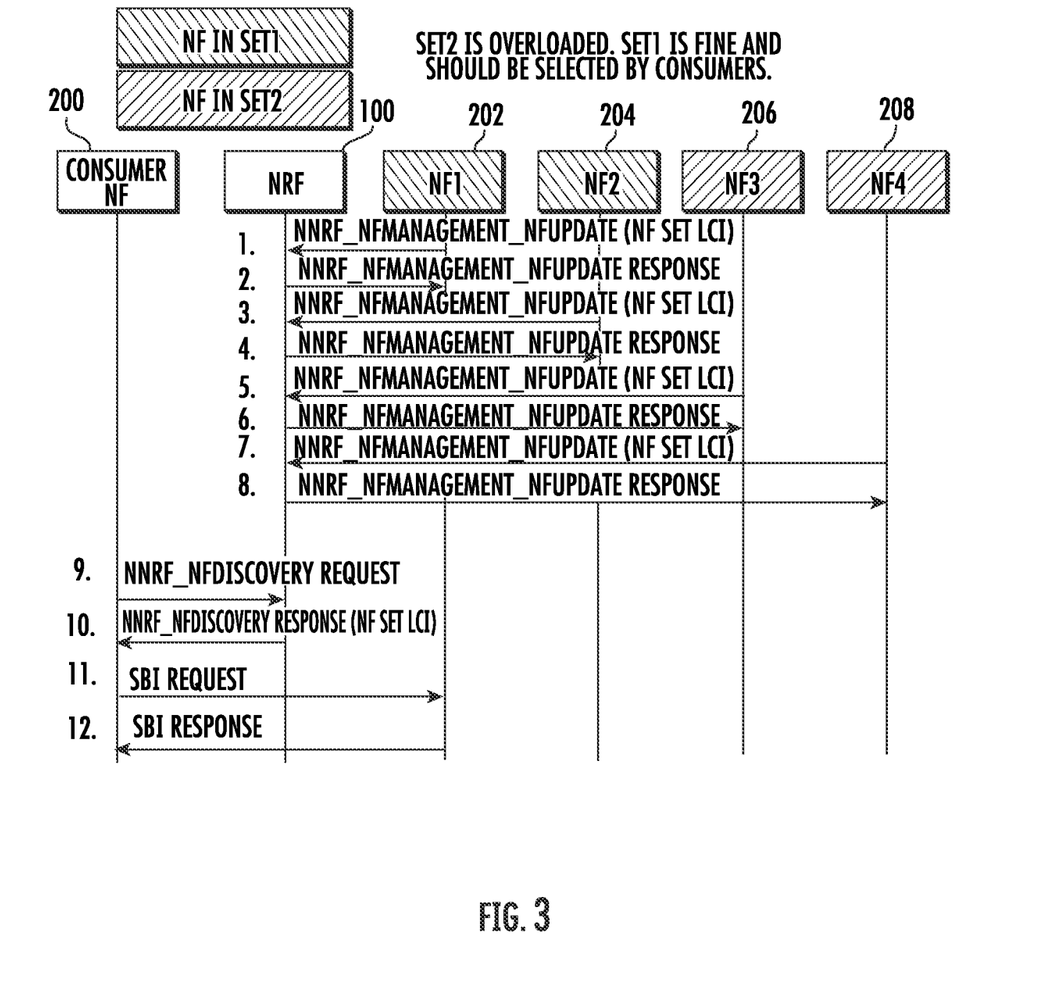
FIG. 3 is a message flow diagram illustrating exemplary messages exchanged for NF discovery and selection by conveying NF set LCI in an NF discovery response where producer NF instances report NF set LCI to the NRF.

In order to avoid this difficulty, the NRF may determine NF set LCI, either through reporting from producer NFs or by calculating the NF set LCI from NF instance LCI values reported by producer NF instances and may include the NF set LCI in a discovery response. FIG. 3 is a message flow diagram where producer NF instances report NF set LCI in NFUpdate messages to the NRF and the NRF includes the NF set LCI in a discovery response to the consumer NF. In FIG. 3, producer NFs convey NF Set LCI via Nnrf_NF-Managment_NFUpdate messages to the NRF. In one example, the Nnrf_NFManagement_NFUpdate messages are NF heart-beat messages. An NF heart-beat message is an Nnrf_NFManagement_NFUpdate message sent from a producer NF to the NRF every heart-beat time interval (defined by the NRF) to indicate that the producer NF is still available. The term "NFUpdate message" will be used herein to refer to any type of Nnrf_NFManagement_NFUpdate message sent from a producer NF to the NRF to convey NF set or NF instance LCI. The NRF conveys the NF set LCI to a consumer NF in a discovery response. The consumer NF uses the NF set LCI in selecting an NF to process an SBI request. The consumer NF will select the least overloaded NF set and NF.

Referring to the message flow in FIG. 3, in step 1, NF1 202 sends an NFUpdate message to NRF 100 to update the status of NF1 202 with NRF 100. In this example, the NFUpdate message includes the LCI for the NF set, Set1. NRF 100 stores the NF set LCI in an NF set LCI database or in the NF profile database. In step 2 of the message flow diagram, NRF 100 responds to the NFUpdate message in step 1 with an NFUpdate response.

In step 3 of the message flow diagram, NF2 204 sends an NFUpdate message to NRF 100. The NFUpdate message may include LCI for the NF set, Set1. NRF 100 may update the previously stored LCI for Set1. In step 4 of the message flow diagram, NRF 100 responds to the NFUpdate message in step 3 with an NFUpdate response.

In step 5 of the message flow diagram, NF3 206 sends an NFUpdate message to NRF 100. The NFUpdate message may include LCI for the NF set, Set2. NRF 100 stores the LCI for Set2 in the NF set LCI database or in the NF profiles database. In step 6 of the message flow diagram, NRF 100 responds to the NFUpdate message in step 5 with an NFUpdate response.

In step 7 of the message flow diagram, NF4 208 sends an NFUpdate message to NRF 100. The NFUpdate message may include LCI for the NF set, Set2. NRF 100 may update the previously stored LCI for Set2. In step 8 of the message flow diagram, NRF 100 responds to the NFUpdate message in step 7 with an NFUpdate response.

In step 9 of the message flow diagram, consumer NF 200 sends an NF discovery request to NRF 100. NRF 100 receives the NF discovery request and performs a look up in its NF profiles database using query parameters in the NF discovery request. NRF 100 locates NF profiles that match the query in the NF discovery request. In step 10, NRF 100 sends an NF discovery response to consumer NF 200. The NF discovery response includes the NF profiles that match the query parameters identified in the NF discovery request. The NF discovery response also includes NF set LCI for the NF sets of the producer NFs whose NF profiles are included in the NF discovery response.

Consumer NF 200 receives the NF discovery response and selects one of the producer NFs to provide service based on priority parameters specified in the NF profiles, NF set loading information, and NF instance loading information. Using the data in Tables 2 and 3, NF set Set1 is the least loaded NF set. As a result, even though NF4 208 is the least loaded NF instance, because NF4 208 is a member of NF Set, Set2, which is more loaded than NF set, Set1, consumer NF 200 selects NF1 202 of NF set, Set1, to provide the service. In step 11, consumer NF 100 sends and SBI request message to producer NF 202. In step 12, producer NF 202 responds to the SBI request with an SBI response indicating successful processing of the SBI request.

Figure 4:
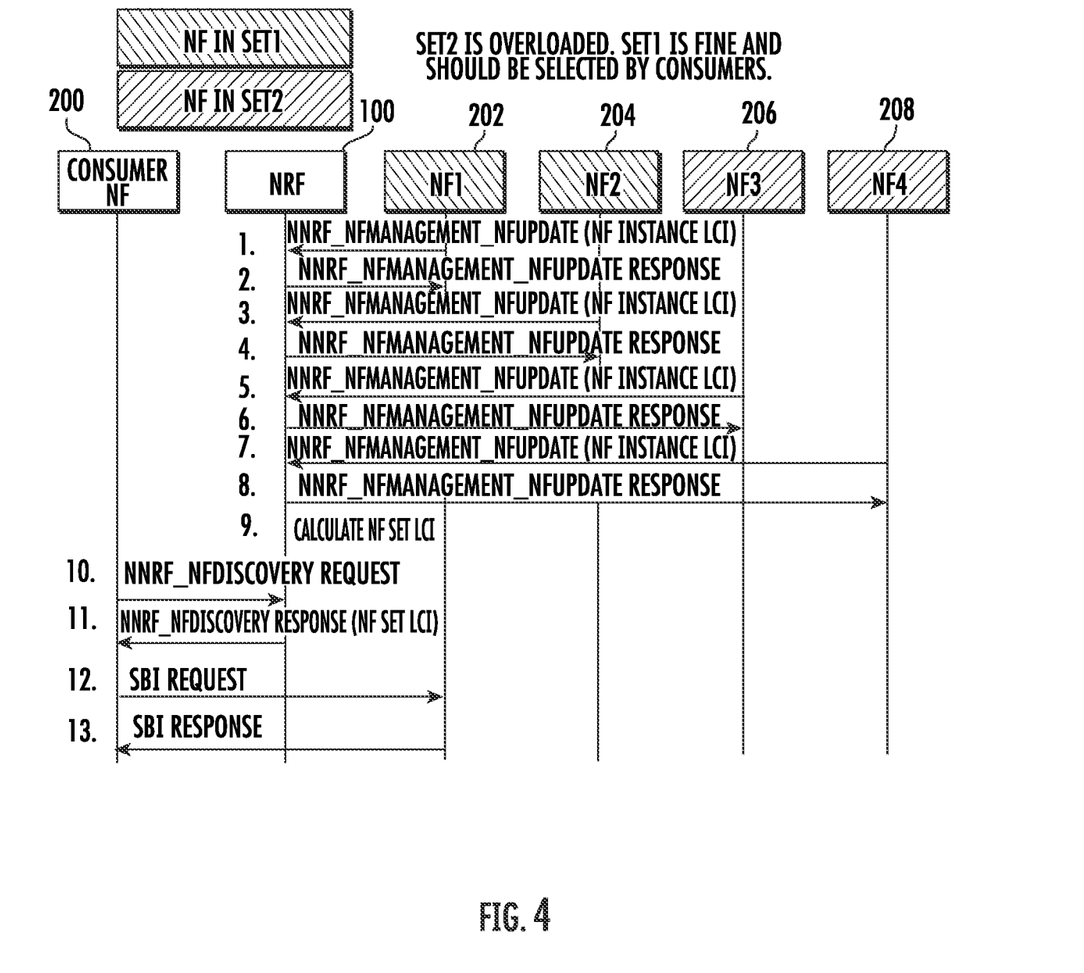
FIG. 4 is a message flow diagram illustrating exemplary messages exchanged for NF discovery and selection by conveying NF set LCI in an NF discovery response where producer NF instances report NF instance LCI to the NRF and the NRF calculates NF set LCI from the NF instance LCI.

In the example illustrated in FIG. 3, the producer NF instances determine NF set LCI and report the NF set LCI to the NRF. Such an implementation requires communication among producer NF instances and may lead to duplicate calculations at the producer NF instances and excessive messaging among the producer NF instances. In an alternate implementation, the producer NF instances may report NF instance LCI to the NRF, and the NRF may calculate the NF set LCI and report the NF set LCI in NF discovery responses. FIG. 4 illustrates such an implementation. Referring to FIG. 4, in step 1, NF1 202 sends an NFUpdate message to NRF 100 to update the status of NF1 202 with NRF 100. In this example, the NFUpdate message includes the LCI of NF1 202. NRF 100 stores the LCI of NF1 202 in an NF LCI database or in the NF profile database. In step 2 of the message flow diagram, NRF 100 responds to the NFUpdate message in step 1 with an NFUpdate response.

In step 3 of the message flow diagram, NF2 204 sends an NFUpdate message to NRF 100. The NFUpdate message may include LCI for NF2 204. NRF 100 may store the LCI for NF2 204. In step 4 of the message flow diagram, NRF 100 responds to the NFUpdate message in step 3 with an NFUpdate response.

In step 5 of the message flow diagram, NF3 206 sends an NFUpdate message to NRF 100. The NFUpdate message may include LCI for NF3 206. NRF 100 stores the LCI for NF3 206. In step 6 of the message flow diagram, NRF 100 responds to the NFUpdate message in step 5 with an NFUpdate response.

In step 7 of the message flow diagram, NF4 208 sends an NFUpdate message to NRF 100. The NFUpdate message may include LCI for NF4 208. NRF 100 may store the LCI for NF4 208. In step 8 of the message flow diagram, NRF 100 responds to the NFUpdate message in step 7 with an NFUpdate response.

In step 9 of the message flow diagram, NRF 100 calculates the NF set LCI for Set1 and Set2 based on the NF instance LCI received from producer NFs 202, 204, 206, and 208. It is understood that NRF 100 could calculate the NF set LCI at any time when NRF 100 has sufficient information to calculate the NF set LCI. For example, NRF 100 could calculate the NF set LCI for Set1 after step 3 and the NF set LCI for Set2 after step 7. In addition, any suitable method for calculating the NF set LCI may be used. In one example, NRF 100 may calculate the NF set LCI by summing the normalized NF instance LCI for producer NF instances that are members of an NF set. Equations 1 and 2 shown below illustrate an example calculation that may be performed by NRF 100 in generating LCI for an NF set by summing the normalized NF instance LCI values for NF set members.

$$\text{Load}(\textit{nf Set}) = \sum \text{Normalized Loads of } \textit{NF} \text{ Instances} \quad (1)$$

$$\text{Normalized Load of } \textit{NF}_n = \frac{\text{Load}_n * \text{Capacity}_n}{\sum \text{Capacities of } \textit{NF} \text{ instances in the } \textit{NF} \text{ set}} \quad (2)$$

where load(nfSet) is the calculated load of the NF set, $NF_n$ is the $n^{th}$ NF instance whose normalized load is being calculated, n is an integer, $Load_n$ is a computed or reported load of $NF_n$ and $Capacity_n$ is a processing capacity of $NF_n$.

In step 10 of the message flow diagram, consumer NF 200 sends an NF discovery request to NRF 100. NRF 100 receives the NF discovery request and performs a look up in its NF profiles database using query parameters in the NF discovery request. NRF 100 locates NF profiles that match the query parameters in the NF discovery request. In step 11, NRF 100 sends an NF discovery response to consumer NF 200. The NF discovery response includes the NF profiles that matched the query parameters identified in the NF discovery request. The NF discovery response also includes NF set LCI for the NF sets of the producer NFs whose NF profiles are included in the NF discovery response.

Consumer NF 200 receives the NF discovery response and selects one of the producer NFs to provide service based on priority parameters specified in the NF profiles, NF set loading information, and NF instance loading information. Using the data in Tables 2 and 3, NF set Set1 is the least loaded NF set. As a result, even though NF4 208 is the least loaded NF, because NF4 208 is a member of NF Set, Set2, which is more loaded than NF set, Set1, consumer NF 200 selects NF1 202 of NF set, Set1, to provide the service. In step 11, consumer NF 100 sends and SBI request message to producer NF 202. In step 12, producer NF 202 responds to the SBI request with an SBI response indicating successful processing of the SBI request.

Figure 5:
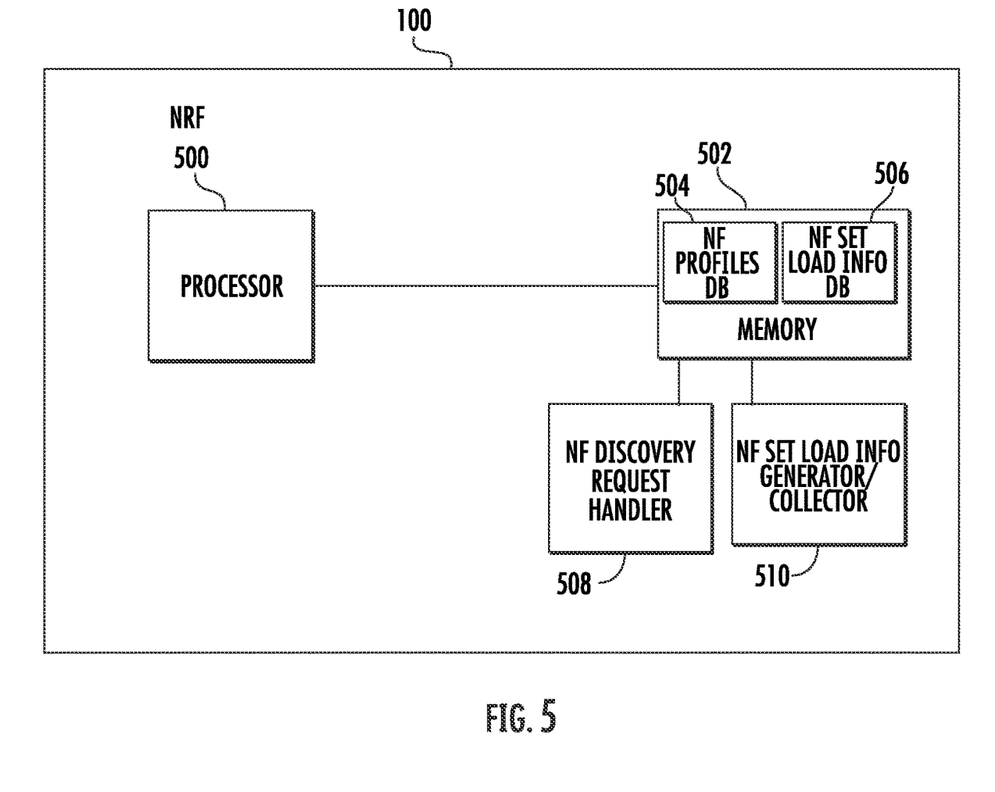
FIG. 5 is a block diagram illustrating an exemplary architecture for an NRF that generates NF set load information aware discovery responses.

FIG. 5 is a block diagram illustrating an exemplary architecture for NRF 100 that is capable of generating NF set and LCI and reporting the LCI in an NF discovery response. Referring to FIG. 5, NRF 100 includes at least one processor 500 and a memory 502. NRF 100 further includes an NF profiles database 504 for storing NF profiles of producer NFs that are registered with NRF 100. NRF 100 may also include an NF set load information database 506 that stores NF set load information that is collected or generated by NRF 100. NF set load information database 506 may be separate from or included in NF profiles database 504. NRF 100 further includes an NF discovery request handler 508 for receiving NF discovery requests, performing lookups in databases 504 and 506 to obtain NF profiles and NF set LCI for the discovery requests, and responding to the discovery requests using the NF profiles and the NF set LCI. NRF 100 further includes an NF set load information generator/collector 510 for generating or collecting NF set load information (LCI) and storing the NF set load information in NF set load information database 506 local to the NRF. NF set discovery request handler 508 and NF set load information generator/collector 510 may be implemented using computer executable instructions stored in memory 502 and executable by processor 500.

Figure 6:
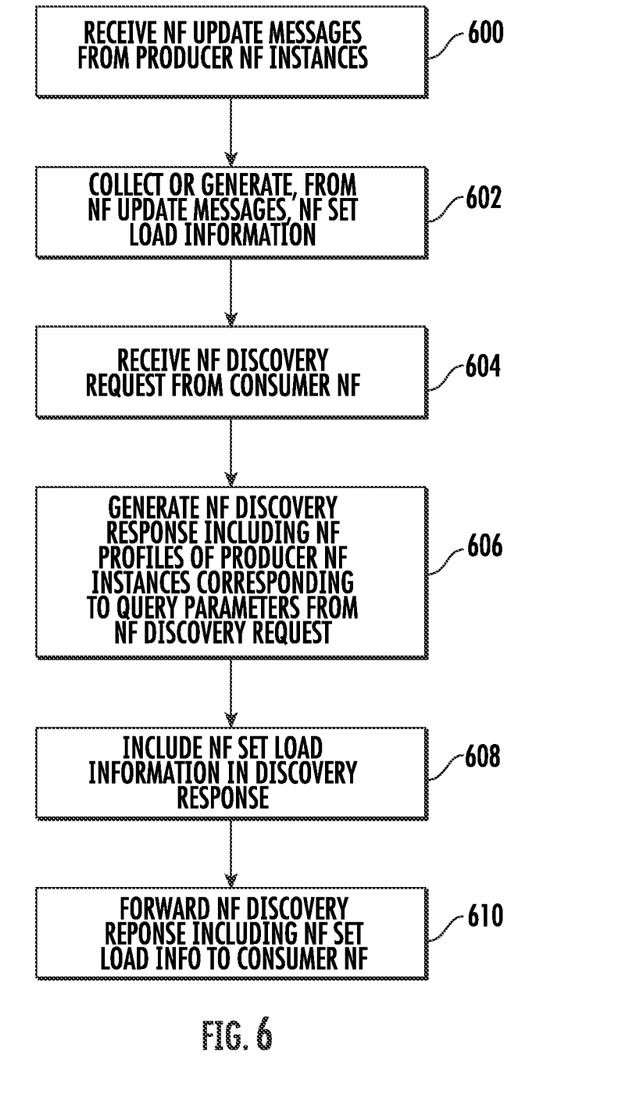
FIG. 6 is a flow chart illustrating an exemplary process for generating NF set load information aware discovery responses.

FIG. 6 is a flow chart illustrating an exemplary process for generating NF set load information aware NF discovery responses. Referring to FIG. 6, in step 600, the process includes receiving NFUpdate messages from producer NF instances. For example, NRF 100 may receive NF heart-beat or other type of NFUpdate messages from producer NF instances that are registered with NRF 100.

In step 602, the process includes collecting or generating, from the NFUpdate messages, NF set load information of NF sets of which the producer NF instances are members. For example, if the NFUpdate messages include NF set LCI reported by the producer NFs, NRF 100 may read the NF set LCI from the NFUpdate messages and store the messages in a database local to NRF 100. If the NFUpdate messages do not include NF set LCI but instead include NF instance LCI, NRF 100 may calculate the NF set LCI from the NF instance LCI and store the NF set LCI in a database local to NRF 100. If the NFUpdate messages include NF set LCI or NF instance LCI, NRF 100 may generate NF set OCI from the collected or calculated NF set LCI.

In step 604, the process includes receiving, from a consumer NF, an NF discovery request. For example, NRF 100 may receive an NF discovery request from a consumer NF. The NF discovery request may include query parameters, such as target NF type, that can be used to identify NF profiles of producer NF instances capable of providing the service requested by the consumer NF.

In step 606, the process includes generating, using query parameters in the NF discovery request, an NF discovery response including NF profiles of producer NF instances corresponding to the query parameters. For example, NRF 100 may use the query parameters from the NF discovery request to perform a lookup in the NF profiles database to locate NF profiles with attributes that match the query parameters.

In step 608, the process includes, including in the NF discovery response, NF set load information for NF sets of producer NF instances whose NF profiles are included in the NF discovery response. For example, NRF 100 may insert the NF set load information in one or more 3gpp-Sbi-Lci headers of the NF discovery response. In step 610, the process includes forwarding the NF discovery response including the NF set load information to the consumer NF. For example, NRF 100 may forward the NF discovery response including the NF set load information to the consumer NF that sent the NF discovery request.

The subject matter described herein achieves at least the following advantages:

Proactively reduces SBI request failures by making NF set load information available to consumer NFs prior to initial NF selection;

Reduces the amount of SBI request traffic by reducing the number of retries due to SBI request failures; and Makes more efficient use of producer NF resources by more evenly loading producer NF sets and producer NF instances.

The disclosure of each of the following references is hereby incorporated herein by reference in its entirety.

REFERENCES

1. $3^{rd}$ Generation Partnership Project; Technical Specification Group Core Network and Terminals; 5G System; Technical Realization of Service Based Architecture; Stage 3 (Release 17) 3GPP TS 29.500 V17.2.0 (2021-03).
2. $3^{rd}$ Generation Partnership Project; Technical Specification Group Services and System Aspects; System architecture for the 5G System (5GS); Stage 2 (Release 17) 3GPP TS 23.501 V17.0.0 (2021-03).
3. $3^{rd}$ Generation Partnership Project; Technical Specification Group Core Network and Terminals; 5G System; Network Function Repository Services; Stage 3 (Release 17) 3GPP TS 29.510 V17.1.0 (2021-03).
4. $3^{rd}$ Generation Partnership Project; Technical Specification Group Services and System Aspects; Procedures for the 5G System (5GS); Stage 2 (Release 17) 3GPP TS 23.502 V17.0.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating network function (NF) set load information aware NF discovery responses, the method comprising:
at an NF repository function (NRF):
receiving NFUpdate messages from producer NF instances;
collecting or generating, from the NFUpdate messages, NF set load information for NF sets of which the producer NF instances are members, wherein receiving NFUpdate messages from producer NF instances includes receiving NFUpdate messages including producer NF instance load control information (LCI) and wherein collecting or generating the NF set load information includes reading the NF instance LCI from the NFUpdate messages, calculating NF set LCI from the NF instance LCI, and storing the NF set LCI in a database local to the NRF, wherein calculating the NF set LCI includes generating a sum using the NF instance LCI;
receiving, from a consumer NF, an NF discovery request;
generating, using query parameters in the NF discovery request, an NF discovery response including NF profiles of producer NF instances corresponding to the query parameters;

including, in the NF discovery response, NF set load information for NF sets of producer NF instances whose NF profiles are included in the NF discovery response; and forwarding the NF discovery response including the NF set load information to the consumer NF.

2. The method of claim 1 wherein receiving the NFUpdate messages includes receiving NF heart-beat messages.

3. The method of claim 1 wherein receiving NFUpdate messages from producer NF instances includes receiving NFUpdate messages including NF set LCI and wherein collecting or generating the NF set load information includes reading the NF set LCI from the NFUpdate messages and storing the NF set LCI in a database local to the NRF.

4. The method of claim 1 wherein generating the sum includes adding normalized loads of the producer NF instances using the following expression:

$$Load(nfSet) = \Sigma Normalized\ Loads\ of\ NF\ Instances,$$

where Load(nfSet) is the LCI for the NF set and ΣNormalized Loads of NF Instances is a sum of normalized loads of the producer NF instances.

5. The method of claim 4 comprising computing the normalized loads of the producer NF instances using the following expression:

$$\text{Normalized Load of } NF_n = \frac{Load_n * Capacity_n}{\sum Capacities\ of\ NF\ instances\ in\ the\ NF\ set}$$

where $NF_n$ is the nth producer NF instance whose normalized load is being calculated, n being an integer, $Load_n$ is a computed or reported load is the LCI computed for producer NF instance $NF_n$ and $Capacity_n$ is a processing capacity of producer NF instance $NF_n$.

6. The method of claim 1 comprising, at the consumer NF, using the NF set load information in selecting a producer NF set and a producer NF instance to process a service based interface (SBI) request.

7. The method of claim 6 wherein using the NF set load information in selecting a producer NF set and a producer NF instance to process an SBI request includes selecting a first producer NF set having an NF set control information attribute value that is lower than an NF set load control information attribute value determined for a second producer NF set and selecting a producer NF from producer NFs in the first producer NF set.

8. The method of claim 7 wherein the producer NF selected from the producer NFs in the first NF set has an NF instance load control information attribute value that is higher than an NF instance load control information value than an NF instance load control information value for a producer NF in the second producer NF set.

9. A system for generating network function (NF) set load information aware NF discovery responses, the system comprising:

an NF repository function (NRF) including at least one processor and a memory;

an NF set load information generator/collector implemented by the at least one processor for receiving NFUpdate messages from producer NF instances, collecting or generating, from the NFUpdate messages, NF set load information for NF sets of which the producer NF instances are members, wherein the NFUpdate messages include NF instance load control information (LCI) and wherein the NF set load information generator/collector is configured to collect or generate the NF set load information by reading the NF instance LCI from the NFUpdate messages, calculating NF set LCI from the NF instance LCI, and storing the NF set LCI in a database local to the NRF, wherein the NF set load information generator/collector is configured to calculate the NF set LCI by generating a sum using the NF instance LCI; and an NF discovery request handler implemented by the at least one processor for receiving, from a consumer NF, an NF discovery request, generating, using query parameters in the NF discovery request, an NF discovery response including NF profiles of producer NF instances corresponding to the query parameters, including, in the NF discovery response, NF set load information for NF sets of producer NF instances whose NF profiles are included in the NF discovery response, and forwarding the NF discovery response including the NF set load information to the consumer NF.

10. The system of claim 9 the NFUpdate messages include NF heart-beat messages.

11. The system of claim 9 wherein the NFUpdate messages include NF set LCI and wherein the NF set load information generator/collector is configured to read the NF set LCI from the NFUpdate messages and storing the NF set LCI in a database local to the NRF.

12. The system of claim 9 wherein the NF set load information generator/collector is configured to generate the sum by adding normalized loads of the producer NF instances using the following expression:

$$Load(nfSet) = \Sigma Normalized\ Loads\ of\ NF\ Instances,$$

where Load(nfSet) is the LCI for the NF set and ΣNormalized Loads of NF Instances is a sum of normalized loads of the producer NF instances.

13. The system of claim 12 wherein the NF set load information generator/collector is configured to compute the normalized loads of the producer NF instances using the following expression:

$$\text{Normalized Load of } NF_n = \frac{Load_n * Capacity_n}{\sum Capacities\ of\ NF\ instances\ in\ the\ NF\ set}$$

where $NF_n$ is the nth producer NF instance whose normalized load is being calculated, n being an integer, $Load_n$ is a computed or reported load is the LCI computed for producer NF instance $NF_n$ and $Capacity_n$ is a processing capacity of producer NF instance $NF_n$.

14. The system of claim 9 comprising the consumer NF, wherein the consumer NF is configured to use the NF set load information in selecting a producer NF set and a producer NF instance to process an SBI request by selecting a first producer NF set having an NF set control information attribute value that is lower than an NF set load control information attribute value determined for a second producer NF set and selecting a producer NF from producer NFs in the first producer NF set.

15. The system of claim 14 wherein the producer NF selected from the producer NFs in the first NF set has an NF instance load control information attribute value that is higher than an NF instance load control information value than an NF instance load control information value for a producer NF in the second producer NF set.

16. A non-transitory computer readable medium having Stored thereon executable instructions that when executed by a processor of a computer control the computer to perform steps comprising:

at a network function (NF) repository function (NRF):
- receiving NFUpdate messages from producer NF instances;
- collecting or generating, from the NFUpdate messages, NF set load information for NF sets of which the producer NF instances are members, wherein receiving NFUpdate messages from producer NF instances includes receiving NFUpdate messages including producer NF instance load control information (LCI) and wherein collecting or generating the NF set load information includes reading the NF instance LCI from the NFUpdate messages, calculating NF set LCI from the NF instance LCI, and storing the NF set LCI in a database local to the NRF, wherein calculating the NF set LCI includes generating a sum using the NF instance LCI;
- receiving, from a consumer NF, an NF discovery request;
- generating, using query parameters in the NF discovery request, an NF discovery response including NF profiles of producer NF instances corresponding to the query parameters;
- including, in the NF discovery response, NF set load information for NF sets of producer NF instances whose NF profiles are included in the NF discovery response; and
- forwarding the NF discovery response including the NF set load information to the consumer NF.

\* \* \* \* \*

UNITED STATES PATENT AND TRADEMARK OFFICE
CERTIFICATE OF CORRECTION

PATENT NO. : 11,716,252 B2  
APPLICATION NO. : 17/376082  
DATED : August 1, 2023  
INVENTOR(S) : Rajput et al.

Page 1 of 1

It is certified that error appears in the above-identified patent and that said Letters Patent is hereby corrected as shown below:

In the Drawings

On sheet 6 of 6, in FIG. 6, under Reference Numeral 610, Line 2, delete "REPONSE" and insert -- RESPONSE --, therefor.

In the Specification

In Column 4, Lines 4-5, after "higher" delete "than an NF instance load control information value".

In Column 5, Lines 27-28, after "higher" delete "than an NF instance load control information value".

In Column 6, Line 56, delete "NFS," and insert -- NFs, --, therefor.

In Column 7, Line 55, delete "Instances\" and insert -- Instances --, therefor.

In Column 8, Line 3, delete "Instances\" and insert -- Instances --, therefor.

In the Claims

In Column 15, Line 52, in Claim 8, after "higher" delete "than an NF instance load control information value".

In Column 16, Line 65, in Claim 15, after "higher" delete "than an NF instance load control information value".

In Column 17, Line 2, in Claim 16, delete "Stored" and insert -- stored --, therefor.

Signed and Sealed this  
Tenth Day of September, 2024

Katherine Kelly Vidal  
*Director of the United States Patent and Trademark Office*